No. 891,695. PATENTED JUNE 23, 1908.
J. F. HOCKER & B. M. SMITH.
LAWN MOWER SHARPENER.
APPLICATION FILED JAN. 9, 1908.
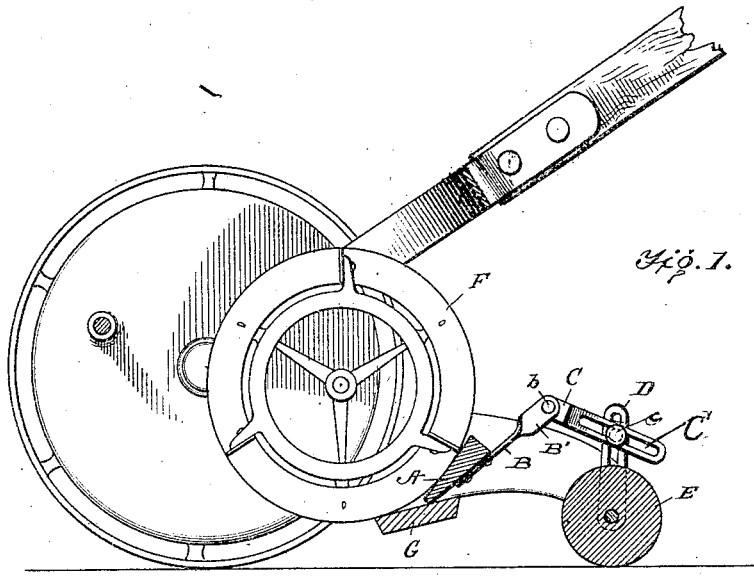
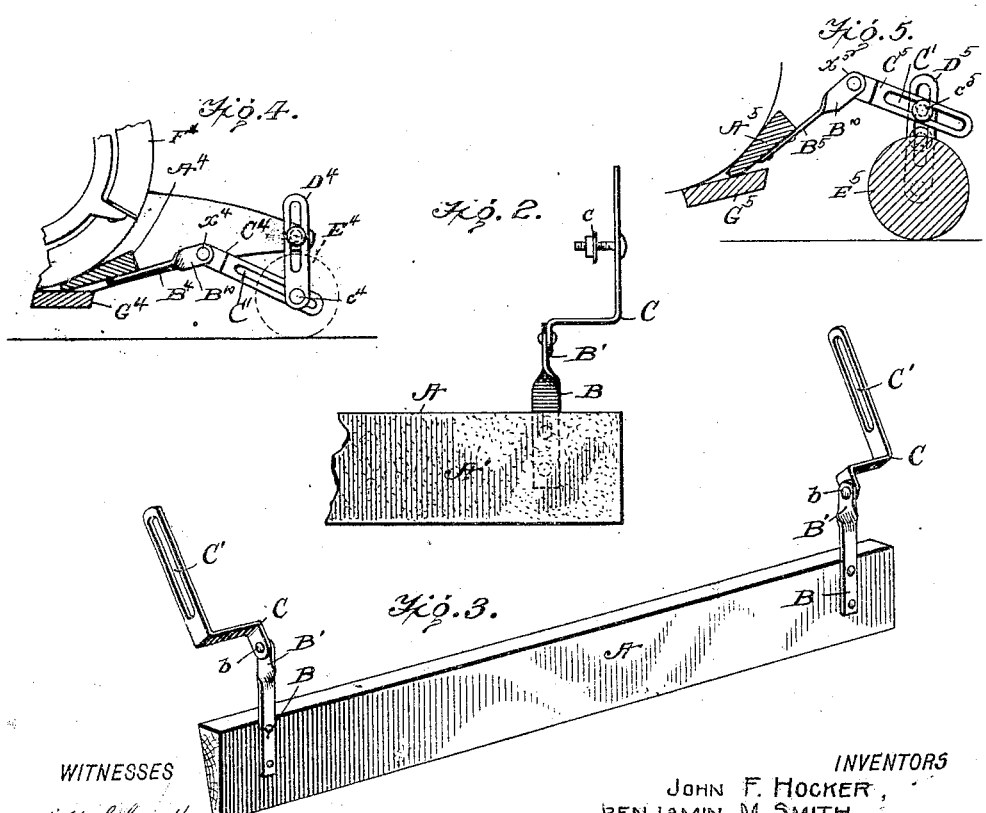
WITNESSES
INVENTORS
JOHN F. HOCKER,
BENJAMIN M. SMITH,
BY
ATTORNEYS

UNITED STATES PATENT OFFICE.

JOHN F. HOCKER AND BENJAMIN M. SMITH, OF MONROE, INDIANA.

LAWN-MOWER SHARPENER.

No. 891,695.

Specification of Letters Patent.

Patented June 23, 1908.

Application filed January 3, 1908. Serial No. 409,991.

*To all whom it may concern:*

Be it known that we, JOHN F. HOCKER and BENJAMIN M. SMITH, citizens of the United States, and residents of Monroe, in the county of Adams and State of Indiana, have invented a new and useful Improvement in Lawn-Mower Sharpeners, of which the following is a specification.

Our invention relates to improvements in sharpeners for the knives of lawn mowers using a rotary reel or blade carrier, the object of our invention being to provide a device which shall be simple, cheap, durable in construction and one which may be easily and quickly attached to an ordinary lawn mower, and one which may readily be adjusted to varying conditions of structure.

Our invention therefore consists in certain novel features of construction, arrangement, and combination of parts as will be hereinafter fully described and pointed out in the claims, reference being had to the accompanying drawings, in which Figure 1 is a vertical section showing application of our device to a lawn mower. Fig. 2 is a detail face view of one end of the sharpener board. Fig. 3 is a perspective view of our attachments detached from a mower. Fig. 4 shows a different mode of attachment, and Fig. 5 still another mode of attachment.

In carrying out our invention we use a board A which may be of wood or other suitable material, the upper face of which is coated with emery forming a coating A'; the upper face of the board slants as shown, so that the front edge of the board is thinner than the rear edge. To the under face of the board A near each end is secured a flat metal rigid bar B which is twisted so that the free end B' stands in a plane at substantially right angles to the main body of the bar B; to the outer ends of said portions B' are pivotally secured by bolts or rivets $b$ the angular slotted arms C, said slotted arms C adapted to be bolted by means of slots C' to the slotted arms D which carry the usual wooden roller; the arms D are provided with bolt holes for the purpose of attaching the same to the mower frame or to the axle of the wooden roller E forming a part of most of the lawn mowers in common use, which use a rotary knife reel F and a stationary shearing plate or blade G.

Our improvement may be applied to the mower in several ways, one of which we will now describe. As shown in Fig. 1 the slotted arms C are turned back and the thin edge of the board A shoved under the knife reel F the thin edge resting on the shearing plate G; the slotted arms C C are then secured to the slotted roller arms D by the bolts $c$. The board A is then brought to its proper adjustment by tapping lightly with a hammer at the point indicated by X; the lawn mower is then run on a smooth surface such as the floor or sidewalk until a sharp edge is produced on the knives of reel F, whereupon all knives will be ground to an exact circle and will all shear clear across the bed or the shearing blade, when it is again adjusted up to the knife reel.

Another way to apply the attachment is to remove the wooden roller from its slotted arms $D^4$ which are carried by the mower frame, and bolt the arms $C^4$ to the slotted arms $D^4$ by the bolts $c^4$ as shown in Fig. 4.

In nearly all lawn mowers now in common use a bolt is furnished which is usually of the same size as our bolts $c$; this bolt is the one that bolts the adjustable roller arms D to the side of the mower frame to regulate the roller for different lengths of grass; this method of attaching is similar to that shown in Fig. 5, except that the bolt furnished with the mower is used instead of the bolts furnished with our attachment, but as the bolts belonging to the mower may be too short, our bolts are furnished with our attachments.

It will thus be seen that we produce a simple, cheap and efficient device for sharpening lawn mower knives, which can be readily applied to and detached from the usual lawn mowers in common use.

It will of course be understood that changes in the form, proportion, and minor details of construction may be resorted to without a material modification or departure from the spirit of our invention.

The shearing blade or plate forming a guide or rest renders our grinding board positive, sure and accurate in its grinding action.

The slotted arms C are bent in angular shape as shown in order that the sharpener board may extend entirely across the mower and rest accurately at all points on the shearing bar G.

We claim:

1. A sharpening device for reel lawn mowers, consisting of a sharpener board adapted to rest upon the upper face of the shearing bar of the mower when said mower is in its normal operative position, said sharpener board being also guided by said shearing bar, and adjustable means for securing said board to the mower frame.

2. A sharpening device for reel lawn mowers consisting of a sharpener board adapted to rest on and be guided by the upper face of the shearing bar of the mower when the mower is in its normal operative position, rigid arms projecting from said board adjacent to its ends, and slotted arms pivotally secured to the free ends of the rigid arms.

3. A sharpening device for reel lawn mowers consisting of a sharpener board adapted to rest upon the upper face of the shearing bar of the mower, and having its upper surface beveled downwardly and forwardly, rigid arms secured to said board adjacent to its ends, and slotted arms pivotally secured at one end to the free ends of the rigid arms and their slotted portions to the frame of the mower.

4. A sharpener for lawn mower knives comprising a sharpener board adapted to rest on and be guided by the shearing bar of the mower, rigid bars attached to said sharpener board at or near the ends thereof, angular bent and slotted arms pivotally secured to the free ends of said rigid bars, and means for securing said slotted angular bars to the mower frame.

JOHN F. HOCKER.
BENJAMIN M. SMITH.

Witnesses:
J. W. EVERHART,
J. A. HENDRICKS.